Figure 1:
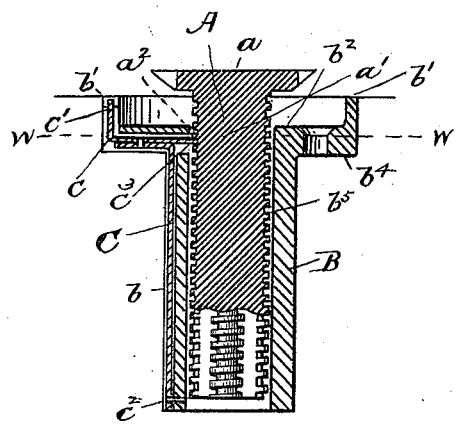

(Model.)

H. D. LANFAIR.
BENCH HOOK.

No. 438,890. Patented Oct. 21, 1890.

WITNESSES.
Frank G. Parker.
Lewis Perrins.

INVENTOR.
Herbert D. Lanfair
by Bowlow S. Parker
his atty.

UNITED STATES PATENT OFFICE.

HERBERT D. LANFAIR, OF MILLER'S FALLS, MASSACHUSETTS, ASSIGNOR TO THE MILLERS FALLS COMPANY, OF SAME PLACE.

BENCH-HOOK.

SPECIFICATION forming part of Letters Patent No. 438,890, dated October 21, 1890.

Application filed November 18, 1889. Serial No. 330,734. (Model.)

*To all whom it may concern:*

Be it known that I, HERBERT D. LANFAIR, of Miller's Falls, in the county of Franklin and State of Massachusetts, have invented certain new and useful Improvements in Bench-Hooks, of which the following, taken in connection with the accompanying drawings, is a specification.

In the drawings like letters of reference indicate corresponding parts.

Figure 2:
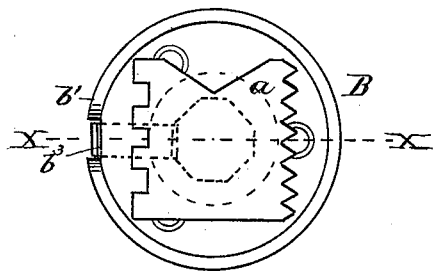
Figure 3:
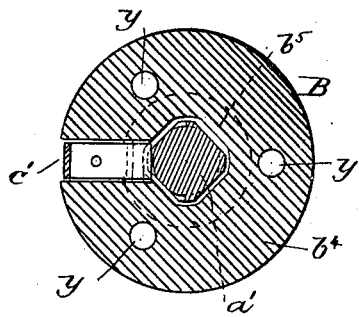

Figure 1 is a sectional elevation on the line X X, Fig. 2. Fig. 2 is a plan view of top portion, showing upper end of dog or head. Fig. 3 is a sectional view of upper portion of shell on the line W W, Fig. 1.

This invention relates to bench hooks or dogs intended to be inserted in carpenters' or wood-workers' benches for the purpose of securing the material when planed or otherwise worked upon.

It consists of two principal parts—first the shell, and second the dog or hook proper.

The peculiar advantages of this device, among others, are its ready application to a work-bench, which can be effected by simply boring two holes to correspond with the body of the shell and its projecting top, its easy and positive adjustability of the hook, its ready removability of parts, the closing down of the hook flush with the top rim of the shell, and the means of operating or adjusting the hook from the top of the bench.

In the drawings, A is the hook part; $a$, the head; $a'$, the stem or shank; $a^2$, notches or grooves, preferably screw-threaded, as hereinafter described, formed upon the stem. The stem is preferably made polygonal in form. The reasons I prefer the shank to be screw-threaded, instead of formed with the ordinary depressions or notches cut across the sides of the shank, are that the cost of manufacture is thereby considerably reduced, and the item of cost in an article of this kind materially affects the marketing or selling of the same. A further reason is that in cutting a thread on a square or hexagonal shank the strength of the shank is not materially weakened, as the chief depth of the thread comes on the corners. Thus the screw-threading of the shank becomes a practical matter that will readily be perceived by any mechanic accustomed to the use of this article. By adjusting the spring C so that the inner end $c^3$ will engage the screw-thread on one of the corners of the shank $a'$, where, of course, the threads are cut deepest, the utmost firmness of parts is secured. It is of course obvious that the same or an equal depth of notch cannot be secured upon the sides by the ordinary means without greatly weakening the shank, as heretofore explained.

B is the shell, preferably made of cast metal round outside body, with a projection near the top, as shown, the said projection having a rim $b'$ projecting upward, so as to form a central recess $b^2$ for the reception of the hook-head $a$ when depressed. The body of the shell is formed with a polygonal hole running from top to bottom, corresponding with and adapted to receive the stem $a'$ of the hook. A recess $b$ is also formed in the side of the body of the shell outside, as indicated in Fig. 1, to receive the spring C, which lies in said recess and is secured to the shell-body at or near its lower end, as indicated by $c^2$. A recess is also formed on the under side of the projection $b^4$ with a hole through the side of the shell-body into its interior. There is also a slight opening $b^3$ in the rim $b'$ for the accommodation of the lip to the spring. The spring C is laid in the recess formed on the side of the shell-body and secured therein at $c^2$ in any convenient manner. The top of said spring (which may be a separate piece secured to the main spring) is formed T-shaped, the inner end passing through the hole in the side of the shell and engaging with the notches formed on the stem of the hook. The other end of the T or cross piece of top of spring is bent upward to form the lip $c'$, said lip filling the opening $b^3$ in the rim $b'$. The spring C is placed in the external recess $b$ to protect it from injury, also to allow its free operation within the recess $b$, and without necessitating any larger hole to be made in the bench than is required for the exterior of the shell-body.

In practice more or less dust and dirt work down the hole in the shell internally, and if the spring were placed in an internal recess it would soon clog up and become inoperative. It is therefore of prime importance that this be prevented. The spring being placed in the external recess $b$ and being fully covered by the projection $b^4$, no dust or dirt can get in to clog the free movement of the spring. These features are important and tend greatly in perfecting the device.

The operation is as follows: The shell being inserted in the bench by simply boring a hole the size of the projection to the shell and in depth equal to the thickness of the rim $b'$, and a smaller hole within the center of the one already made of the size of the body of the shell and in depth equal or greater than its length, the hook A is inserted in the hexagonal hole in the center of the shell, the spring C is pressed back by means of the lip $c'$, and the stem or shank $a'$ is placed at any desired height. Now by releasing the lip $c'$ of the spring C the inner end of the T part of the spring will engage some one of the screw-threads or notches $a^2$ on the hook-stem $a'$, and the hook will be held firmly in place. The hook can be adjusted up or down, or the head $a$ pressed down into the recess $b^2$ of the shell, as desired, by the means described.

I preferably form several kinds of teeth upon the sides of the head, as shown in Fig. 2.

It is obvious that the hook can be quickly removed from the shell and replaced, so that either form of teeth in the head will be presented to the work. It can also be quickly removed to clear of dirt or dust.

This form of bench-hook can be cheaply and strongly made, and it is adjusted from the top, as already described. The grooves or notches $a^2$ can be quickly formed by cutting a coarse thread upon the shank, which can be cheaply done and which will perfectly answer the purpose. The shell can be secured to the bench by screws, if desired, as indicated by the holes $y$, Fig. 3.

By the arrangement of parts as described the spring and its lock part and lip are always protected from injury and are not liable to become clogged by dust or chips. The recesses and slots in shell also permit the free movement of the spring and parts most fully.

Having now fully described my invention, what I desire to claim, and secure by Letters Patent of the United States, is—

1. In a bench-hook, the cast-metal shell B, formed with a central hole adapted to receive the shank of the hook and having the vertical external slot or recess $b$, the vertical spring C, arranged to fit in said slot $b$ and to be suitably secured to said shell and formed with a catch part adapted to operate with said shank of the hook, all combined substantially as and for the purposes set forth.

2. In a bench-hook, the spring C, provided with the lip $c'$ and catch part suitably secured to the shell B in the exterior recess $b$, in combination with the screw-threaded stem $a'$ $a^2$, and adapted to operate substantially as set forth.

3. A bench-hook consisting of the body or shell B, provided with the internal hole $b^5$, the external recess $b$, the projection $b^4$, and rim $b'$, the hook A, having the shank or stem $a'$ and screw-threads $a^2$, and the spring C, adapted to fit into the external recess $b$ and to be suitably secured near its bottom to the shell B, said spring having the lip $c'$ and a catch part arranged to engage the screw-threads $a^2$ and to be operated from the top by means of the said lip $c'$, all arranged and combined substantially as and for the purposes set forth.

In testimony whereof I have signed my name to this specification, in the presence of two subscribing witnesses, on this 11th day of November, A. D. 1889.

HERBERT D. LANFAIR.

Witnesses:
 GEO. W. NIMS,
 E. S. ELLIOT.